United States Patent
Lee et al.

(10) Patent No.: US 10,142,879 B2
(45) Date of Patent: *Nov. 27, 2018

(54) METHOD AND APPARATUS FOR TRANSMITTING CELL LOAD INFORMATION IN WIRELESS COMMUNICATION SYSTEM

(71) Applicant: LG ELECTRONICS INC., Seoul (KR)

(72) Inventors: Insun Lee, Seoul (KR); Daewook Byun, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

This patent is subject to a terminal disclaimer.

(21) Appl. No.: 14/766,057

(22) PCT Filed: Oct. 2, 2013

(86) PCT No.: PCT/KR2013/008814
§ 371 (c)(1),
(2) Date: Aug. 5, 2015

(87) PCT Pub. No.: WO2014/129714
PCT Pub. Date: Aug. 28, 2014

(65) Prior Publication Data
US 2015/0373578 A1    Dec. 24, 2015

Related U.S. Application Data

(60) Provisional application No. 61/766,697, filed on Feb. 20, 2013, provisional application No. 61/821,661, filed on May 9, 2013.

(51) Int. Cl.
*H04L 5/00* (2006.01)
*H04W 28/02* (2009.01)
(Continued)

(52) U.S. Cl.
CPC ....... *H04W 28/0247* (2013.01); *H04W 16/06* (2013.01); *H04W 28/08* (2013.01);
(Continued)

(58) Field of Classification Search
None
See application file for complete search history.

(56) References Cited

U.S. PATENT DOCUMENTS

2011/0274030 A1    11/2011    Wang et al.
2012/0008512 A1    1/2012    Wahlqvist et al.
(Continued)

FOREIGN PATENT DOCUMENTS

EP    2209348 A1 *    7/2010    ............ H04W 88/12
EP    2 453 702 A1    5/2012
(Continued)

*Primary Examiner* — Edan Orgad
*Assistant Examiner* — Sithu Ko
(74) *Attorney, Agent, or Firm* — Birch, Stewart, Kolasch & Birch, LLP

(57) ABSTRACT

A method and apparatus for transmitting cell load information in a wireless communication system is provided. According to an embodiment of the present invention, a master eNodeB (eNB) distributes UMTS terrestrial radio access network (UTRAN) cell load response to slave eNBs. According to another embodiment of the present invention, the master eNB aggregates evolved UTRAN (E-UTRAN) cell load response of slave eNBs to a radio network controller (RNC).

9 Claims, 17 Drawing Sheets

(51) Int. Cl.
 *H04W 16/06* (2009.01)
 *H04W 92/04* (2009.01)
 *H04W 28/08* (2009.01)
 *H04W 72/04* (2009.01)
 *H04W 92/20* (2009.01)

(52) U.S. Cl.
 CPC ....... *H04W 72/0426* (2013.01); *H04W 92/04* (2013.01); *H04W 92/20* (2013.01)

(56) References Cited

U.S. PATENT DOCUMENTS

| | | | |
|---|---|---|---|
| 2012/0021753 A1* | 1/2012 | Damnjanovic | H04W 72/082 455/450 |
| 2012/0040684 A1* | 2/2012 | Gao | H04W 28/08 455/453 |
| 2012/0064896 A1* | 3/2012 | Guo | H04W 36/0066 455/436 |
| 2012/0082064 A1* | 4/2012 | Awoniyi | H04W 24/10 370/255 |
| 2013/0029727 A1* | 1/2013 | Takahashi | H04W 92/02 455/561 |
| 2013/0295926 A1* | 11/2013 | Michel | H04W 36/0061 455/434 |

FOREIGN PATENT DOCUMENTS

| | | | | |
|---|---|---|---|---|
| EP | 2 536 180 A1 | 12/2012 | | |
| WO | WO 2012041118 A1 * | 4/2012 | | H04W 8/02 |

* cited by examiner (a)

(b)

[Fig. 5]
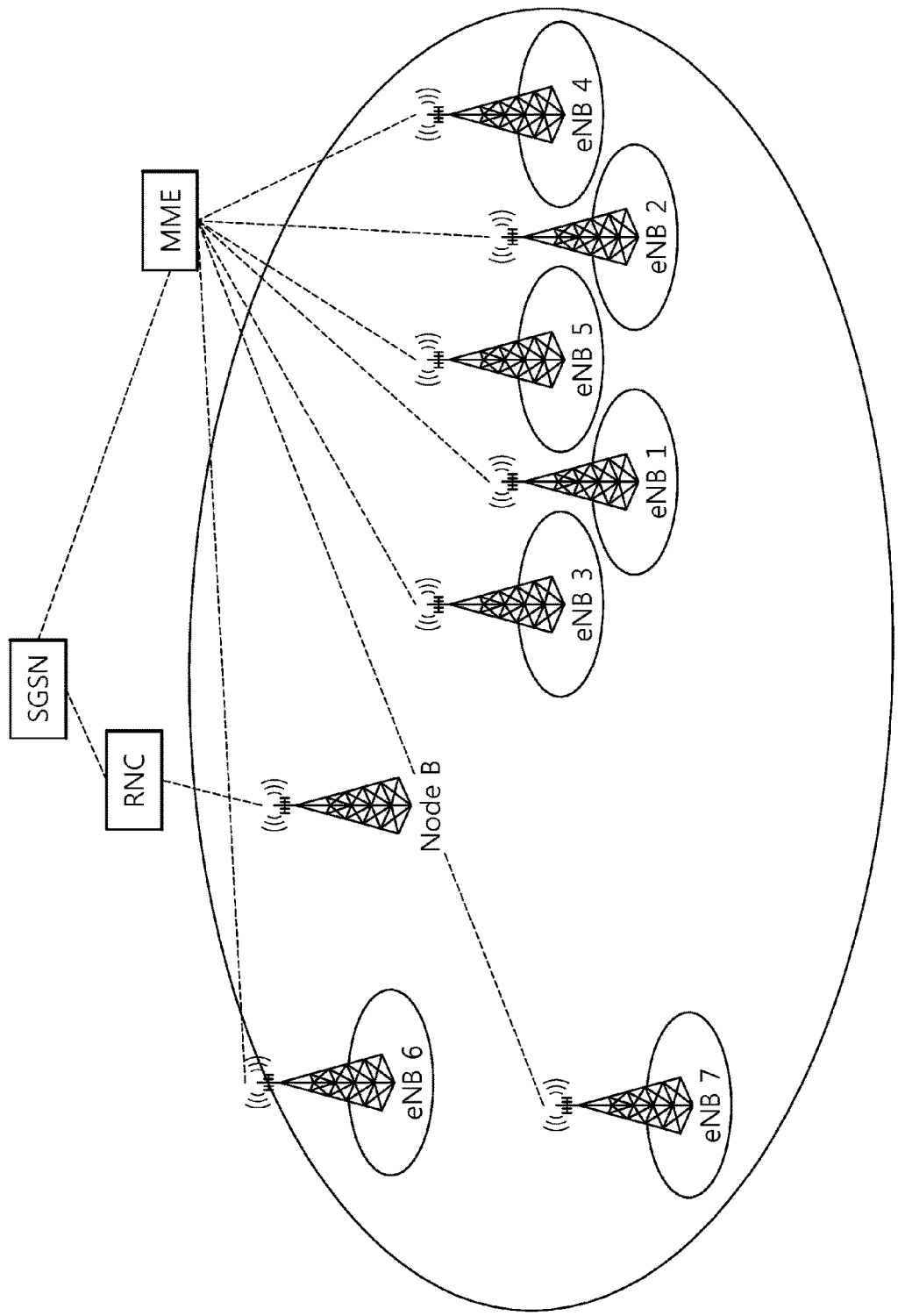

[Fig. 6]
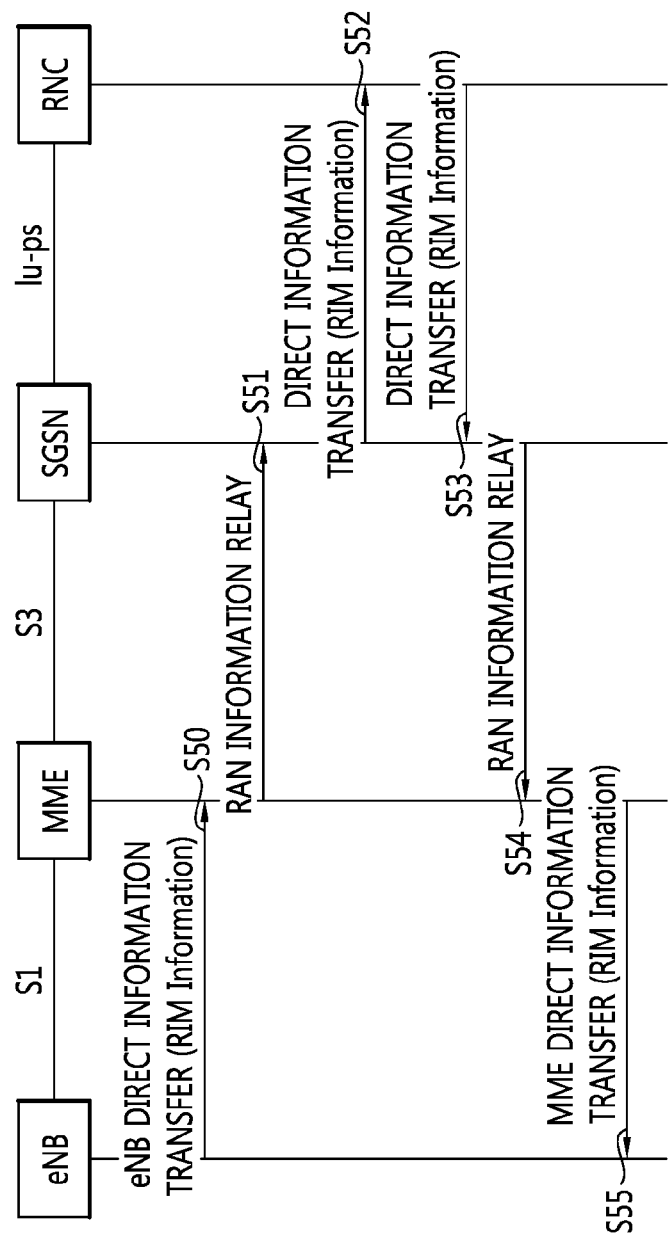

[Fig. 7]
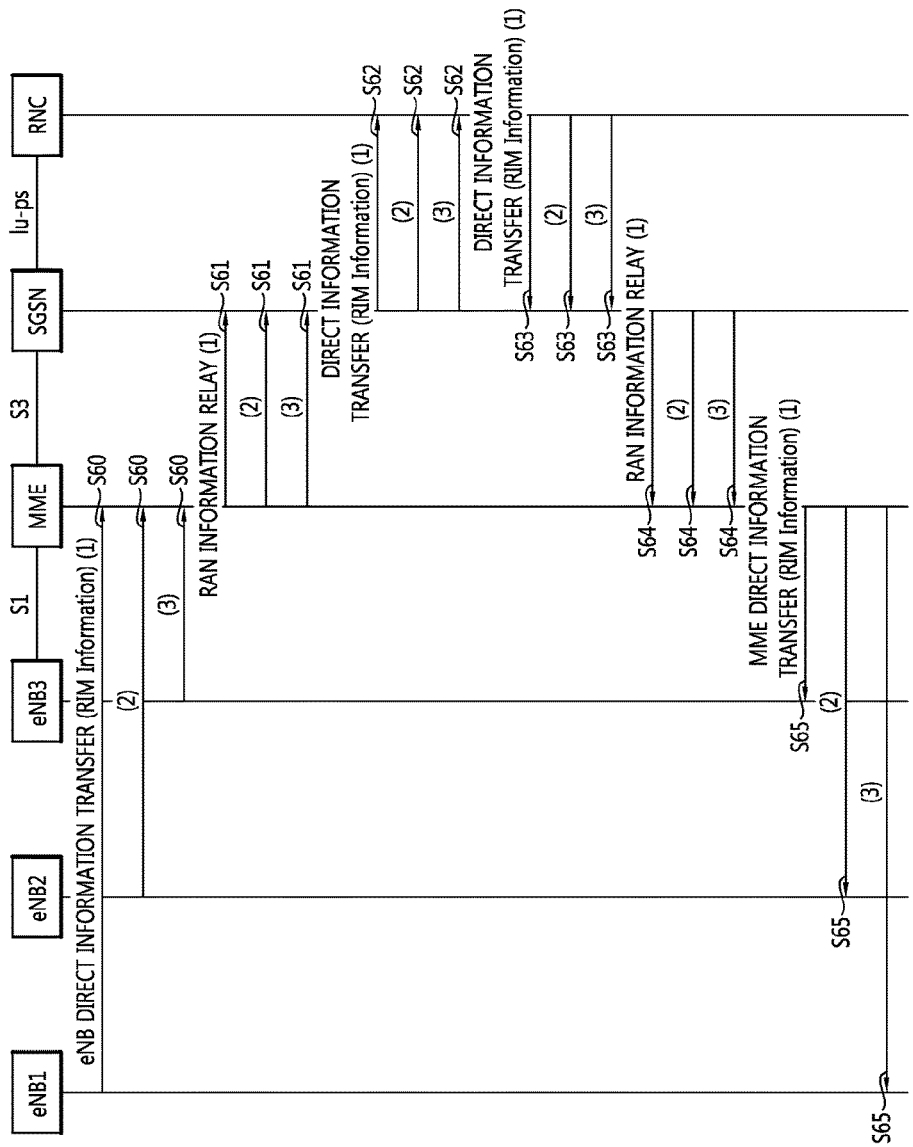
[Fig. 8]
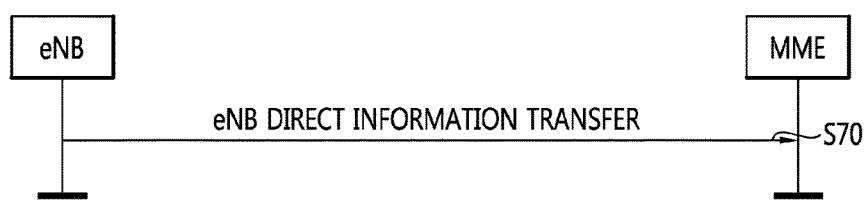
[Fig. 9]
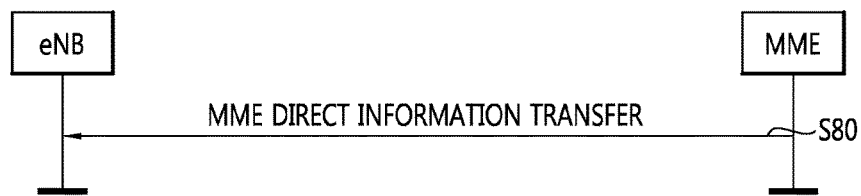

[Fig. 10]
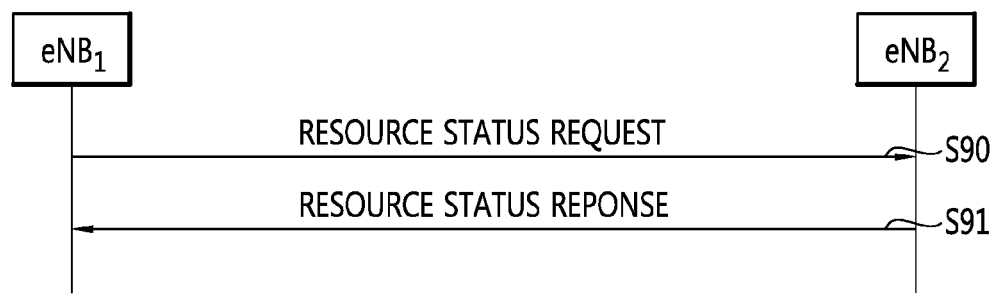
[Fig. 11]
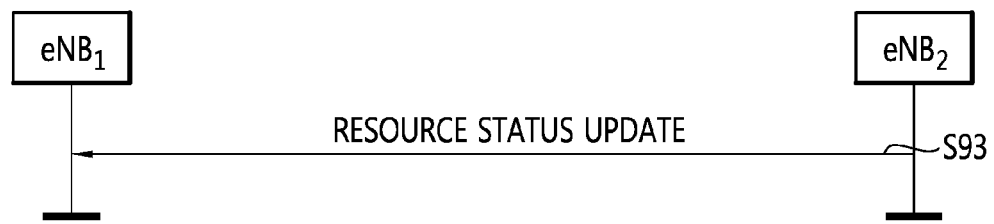

[Fig. 12]
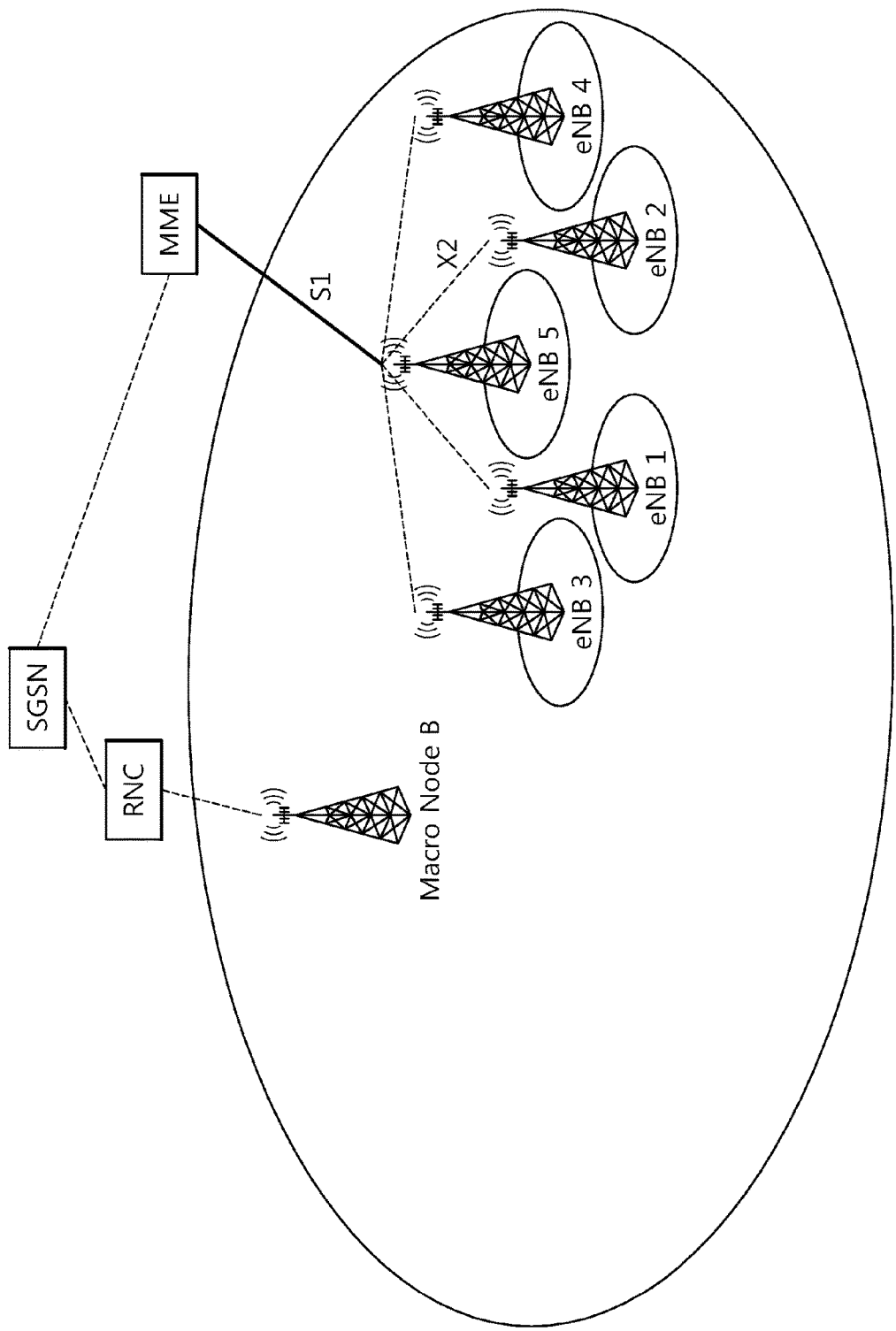

[Fig. 13]
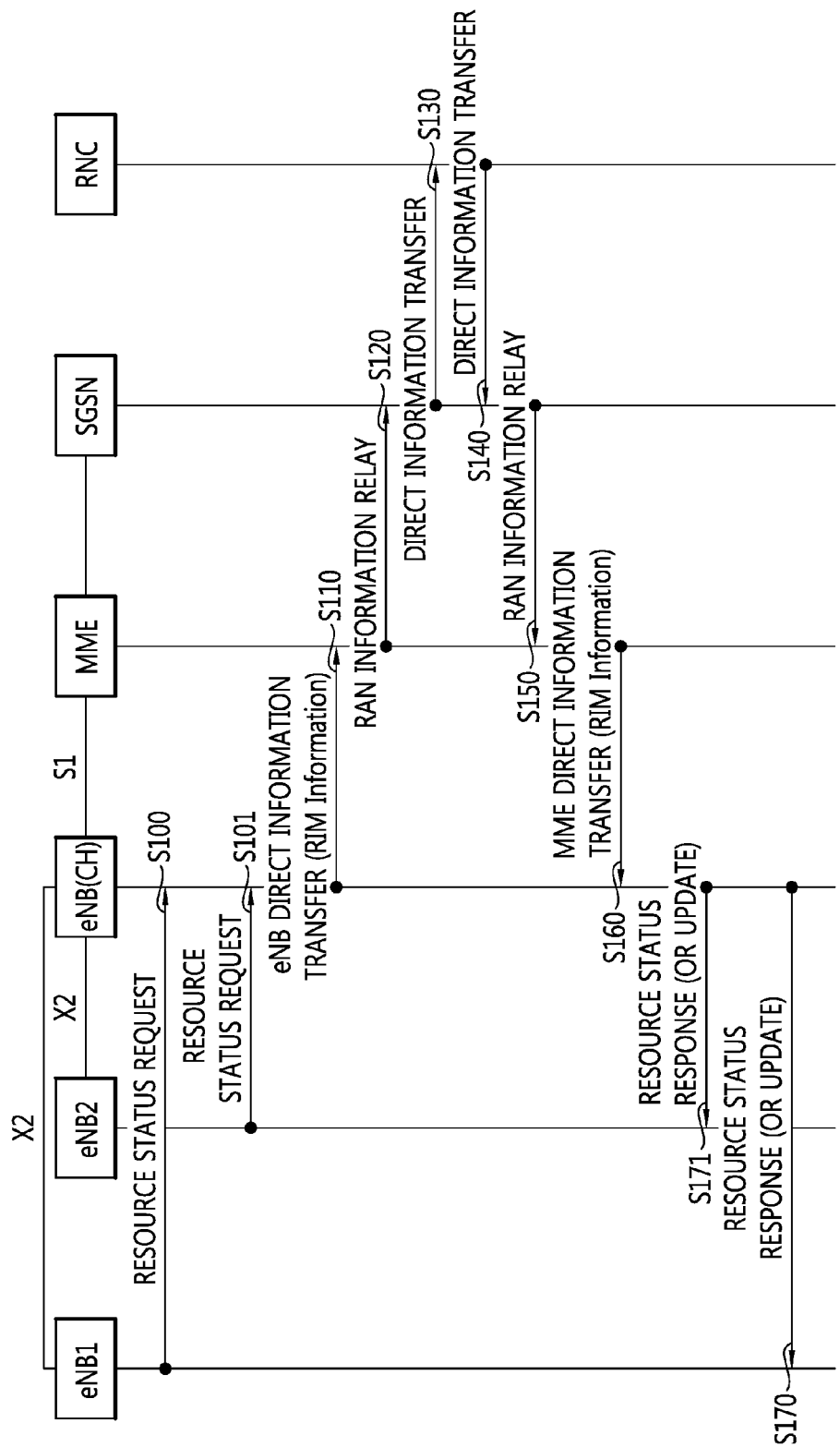

[Fig. 14]
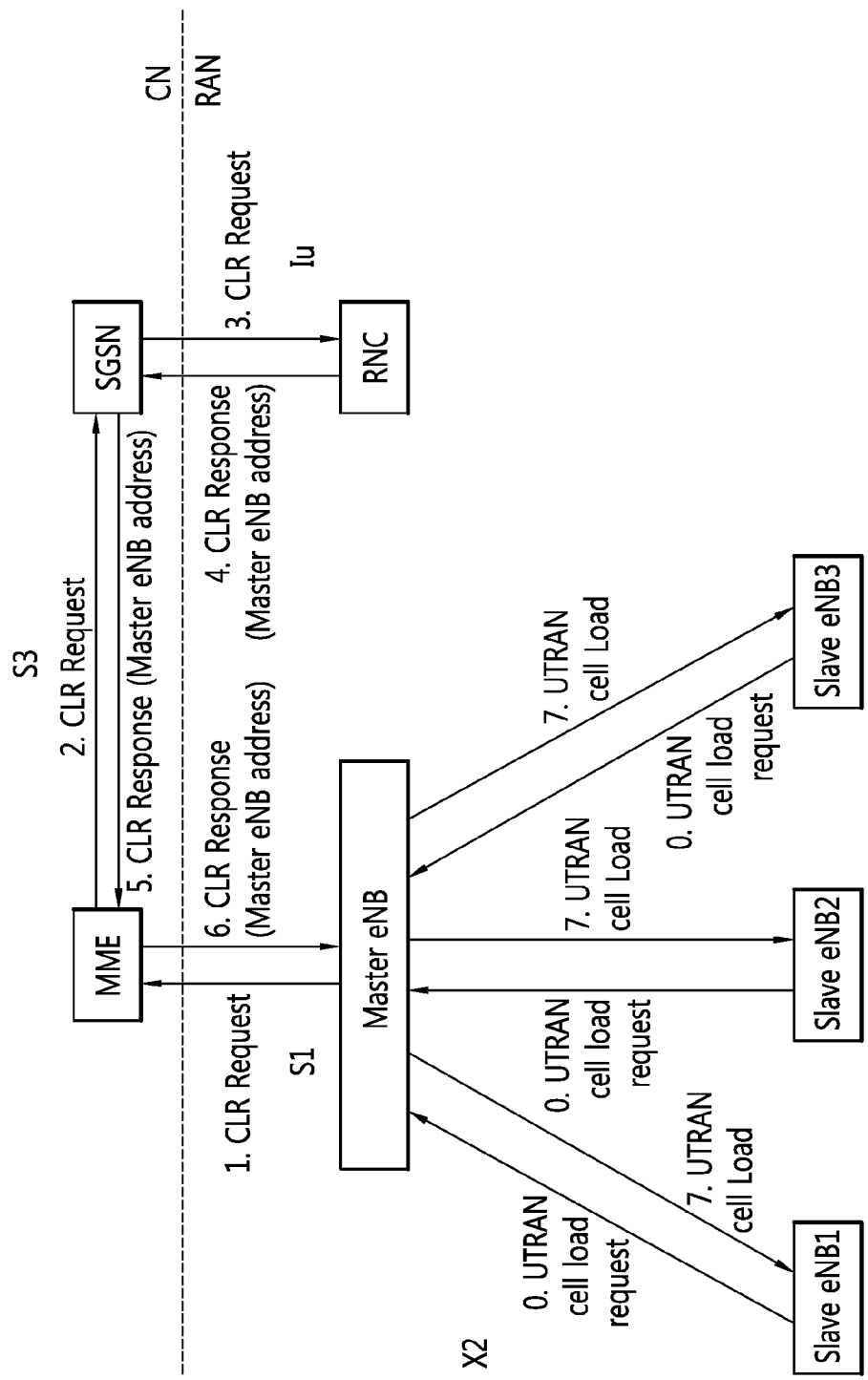

[Fig. 15]
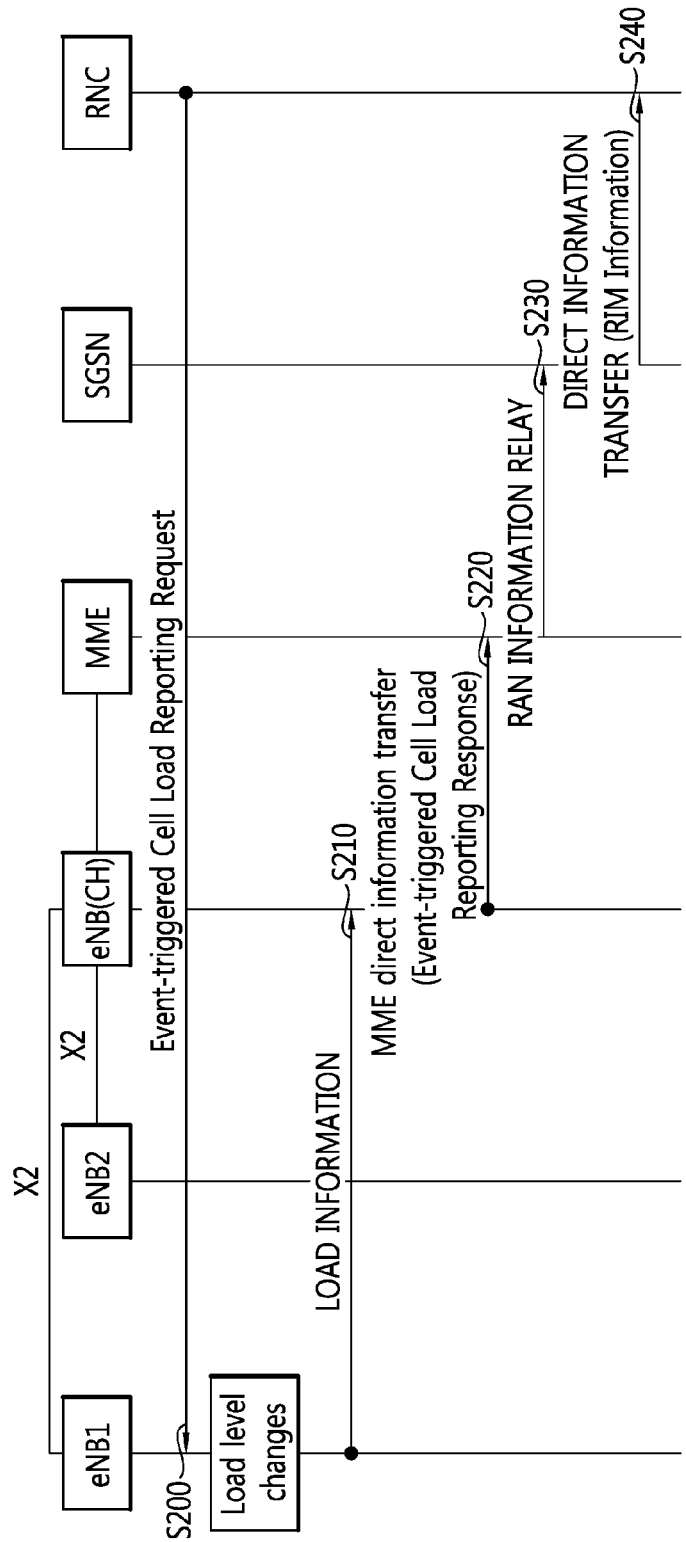

[Fig. 16]
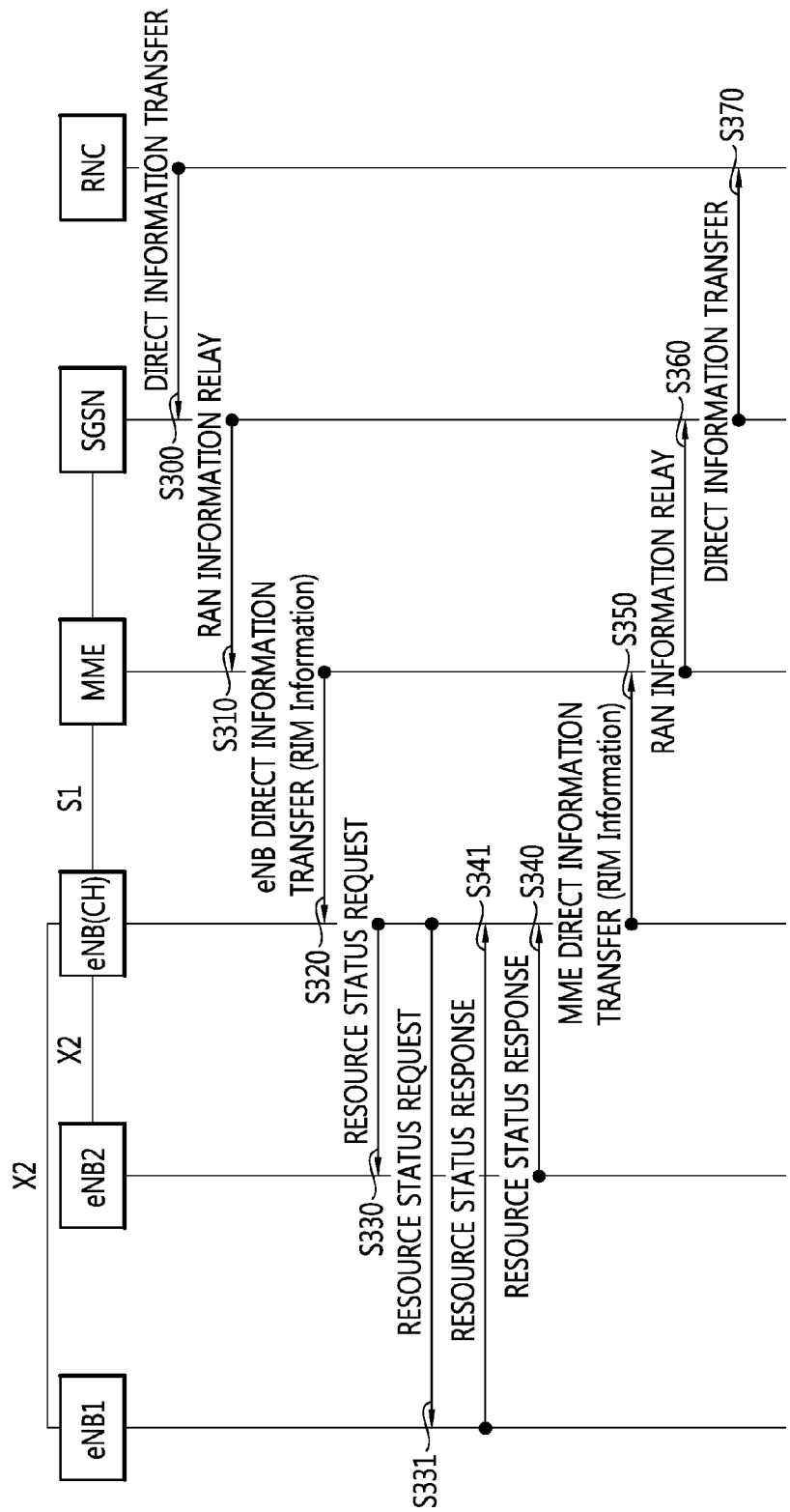

[Fig. 17]
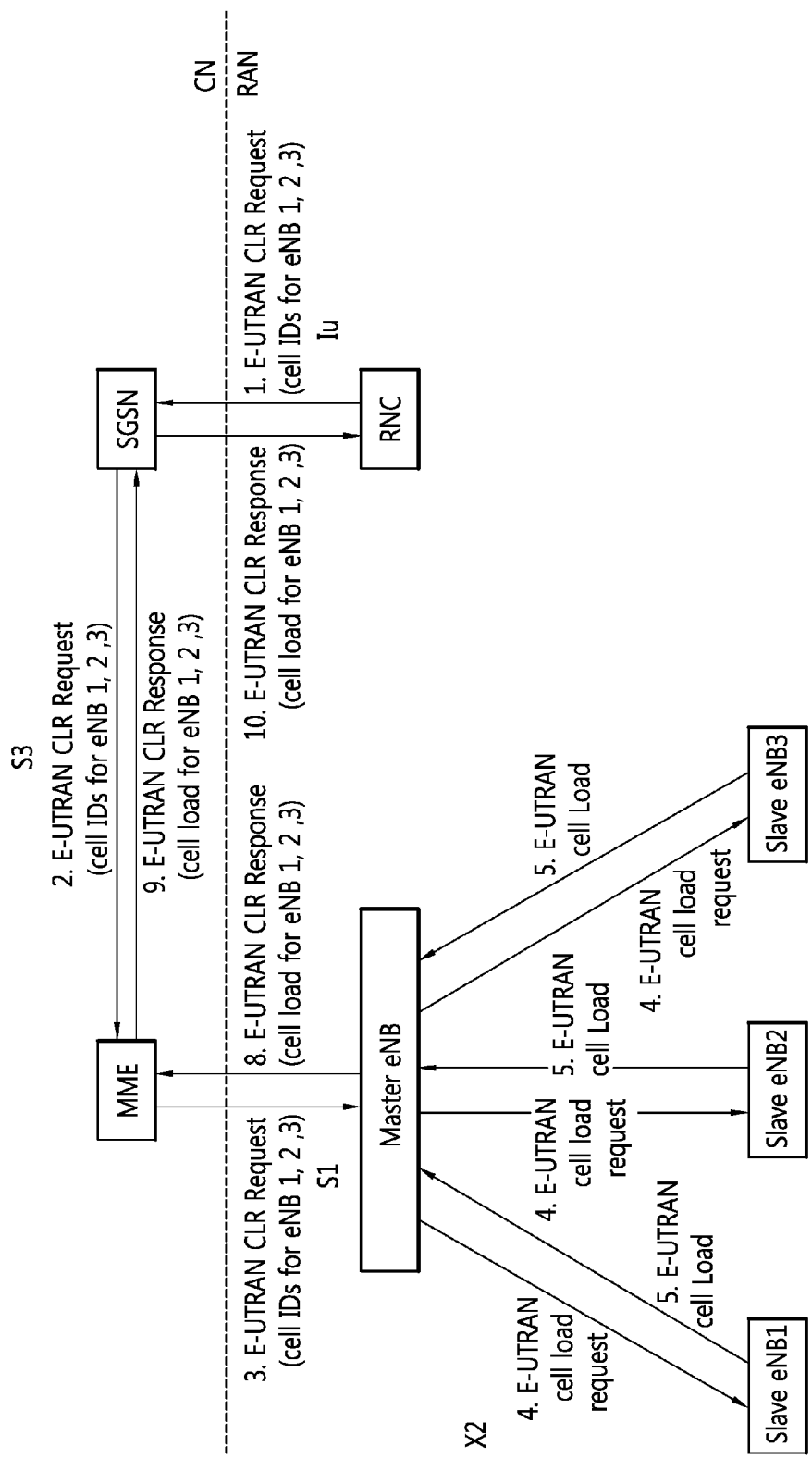

[Fig. 18]
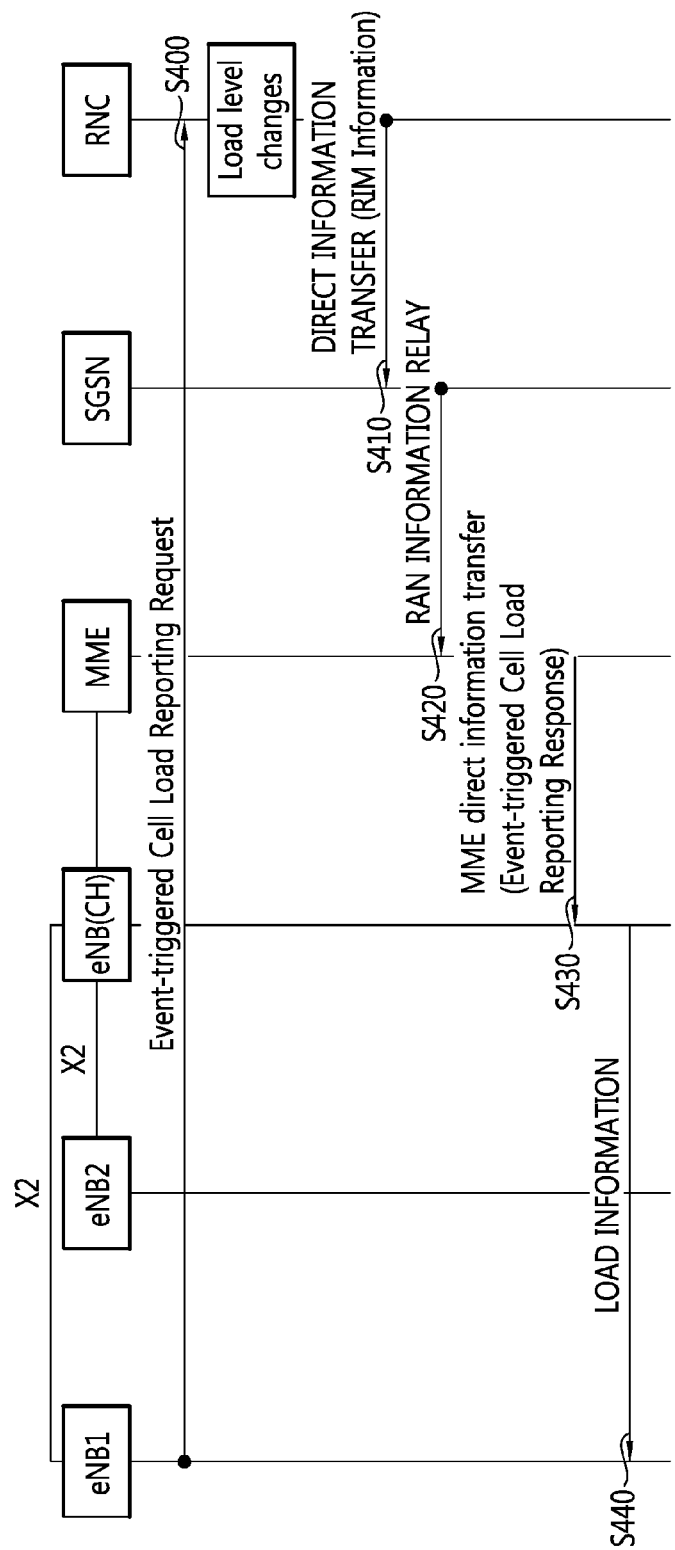

[Fig. 19]
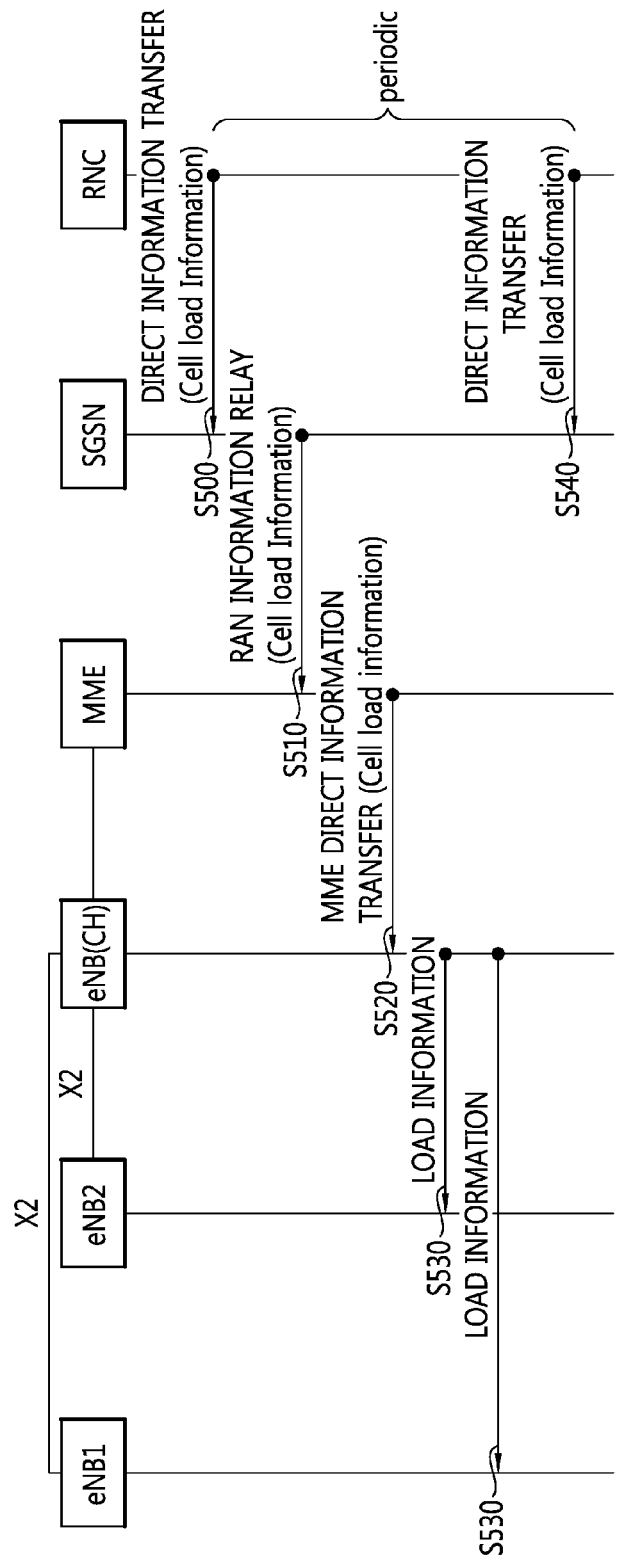

[Fig. 20]
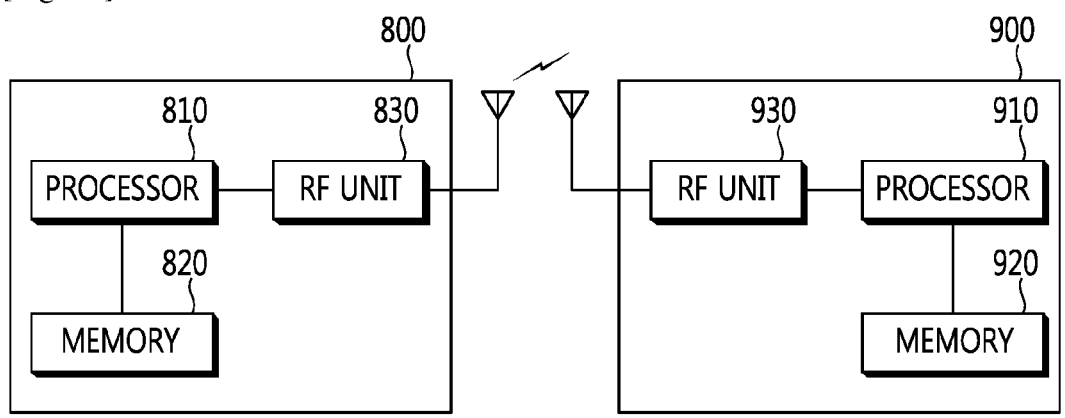

METHOD AND APPARATUS FOR TRANSMITTING CELL LOAD INFORMATION IN WIRELESS COMMUNICATION SYSTEM

CROSS REFERENCE TO RELATED APPLICATIONS

This application is the National Phase of PCT International Application No. PCT/KR2013/008814, filed on Oct. 2, 2013, which claims priority under 35 U.S.C. 119(e) to U.S. Provisional Application No. 61/766,697, filed on Feb. 20, 2013 and 61/821,661 filed on May 9, 2013, all of which are hereby expressly incorporated by reference into the present application.

TECHNICAL FIELD

The present invention relates to wireless communication, and more particularly, to a method and apparatus for transmitting cell load information in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As shown in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As shown, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As shown, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel.

Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer shown in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As shown in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As shown in FIG. 3(b), the RLC and MAC layers (terminated in an eNodeB 20 on the network side) perform the same functions for the control plane. As shown, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As shown in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Long-term coexistence is likely to occur between UMTS/high speed packet access (HSPA) and LTE in one operator's network which places interworking mechanism into a very important position. Currently inter-radio access technology (RAT) handover between UMTS/HSPA and LTE uses relocation procedures. Several small evolutions have been done to make these procedure work better from LTE Rel-8.

However, extensive handover messages and excessive signaling loads in current UMTS/HSPA and LTE interworking may lead to low network efficiency and suboptimal user experience in practical deployments. Such problems could be even more critical in LTE initial deployments (limited LTE coverage) or hotspot type of deployments, leading to frequent inter-RAT handovers and other interoperation procedures.

In order to facilitate multi-RAT deployment and operation, there is a strong need to investigate possible mechanism for seamless UMTS/HSPA and LTE interworking. Besides the enhancement of existing mechanisms, interoperation between two RATs handled by a radio access network (RAN) would be a promising approach in order to benefit mobility performance and reduce impact and resource burden on a core network. Possible performance benefits from RAN level interworking needs to be balanced against the additional impact on network, with reasonable cost guaranteed.

As the LTE systems are deployed with its capability of carrying explosive mobile traffic, it is attractive for covering hotspot areas with small cells with low power nodes. A study item for interworking enhancement of UMTS-LTE has been discussed, and scenarios in which LTE hotspots are deployed in UMTS macro coverage may be discussed. That is, a scenario that E-UTRAN small cells are deployed in traffic hotspots (densely and sparsely) for capacity improvement while a UTRAN macro cell provides full overlapping macro coverage and vice versa may be discussed for interworking enhancement of UMTS-LTE.

An efficient method for interworking of a UMTS macro cell and an LTE small cell may be required.

SUMMARY OF INVENTION

Technical Problem

The present invention provides a method and apparatus for transmitting cell load information in a wireless communication system. The present invention provides architecture in which a cluster head (CH) of long-term evolution (LTE) small cells exists when the LTE small cells are deployed densely, and provides a method for intra-LTE load balancing in the architecture. The present invention also provides a method for interworking of a universal mobile telecommunications system (UMTS) macro cell and an LTE small cell.

Solution to Problem

In an aspect, a method for transmitting, by a first eNodeB (eNB) of a first system, cell load information in a wireless communication system is provided. The method includes receiving cell load information of a cell in a second system, from a radio network controller (RNC) of the second system, and transmitting the received cell load information to a plurality of second eNBs of the first system, respectively.

The cell load information of the cell in the second system may be received using a mobility management entity (MME) direct information transfer message via an S1 interface, and the cell load information of the cell in the second system may be received from the RNC via an MME and a serving GPRS support node (SGSN).

The cell load information of the cell in the second system may include an address or an identifier (ID) of the first eNB, or an ID of the cell in the second system.

The received cell load information may be transmitted using a resource status response message via an X2 interface.

The received cell load information may be transmitted using a resource status update message via an X2 interface.

The method may further include receiving cell load information requests from the plurality of second eNBs of the first system, and the cell load information may be based on the cell load information requests.

The cell load information requests may be received using a resource status request message via an X2 interface.

The cell load information of the cell in the second system may be received in an event-triggered manner.

The first eNB of the first system and the plurality of second eNBs of the first system may be grouped.

In another aspect, a method for transmitting, by a first eNodeB (eNB) of a first system, cell load information in a wireless communication system is provided. The method includes receiving a cell load information request from a radio network controller (RNC) of a second system, transmitting the received cell load information request to a plurality of second eNBs of the first system, respectively, receiving cell load information of the plurality of second eNBs from the plurality of second eNBs, respectively, and transmitting the received cell load information of the plurality of second eNBs to the RNC of the second system.

The cell load information request may be received using a mobility management entity (MME) direct information transfer message via an S1 interface, and the cell load information request may be received from the RNC via an MME and a serving GPRS support node (SGSN).

The cell load information request may include addresses or cell identifiers (IDs) of the plurality of second eNBs.

The received cell load information request may be transmitted using a resource status request message via an X2 interface.

The cell load information of the plurality of second eNBs may be received using a resource status response message via an X2 interface.

The received cell load information of the plurality of second eNBs may be transmitted using an eNB direct information transfer message via an S1 interface.

Advantageous Effects of Invention

Signaling overhead of an S1 interface and a network for acquiring cell information between heterogeneous systems can be reduced when LTE hotspots are deployed in a UMTS macro system.

BRIEF DESCRIPTION OF DRAWINGS

FIG. 5 shows an example of hotspot deployment of LTE small cells with a UMTS macro cell.

FIG. 6 shows an example of a current inter-RAT RIM procedure.

FIG. 7 shows an example of singling overhead according to a current inter-RAT RIM procedure.

FIG. 8 shows an eNB direct information transfer procedure.

FIG. 9 shows an MME direct information transfer procedure.

FIG. 10 shows a resource status reporting initiation procedure.

FIG. 11 shows a resource status reporting procedure.

FIG. 12 shows an example of hotspot deployment of LTE small cells with a UMTS macro cell according to an embodiment of the present invention.

FIG. 13 shows an example of transmitting load information using a cluster head according to an embodiment of the present invention.

FIG. 14 shows another example of transmitting load information using a cluster head according to an embodiment of the present invention.

FIG. 15 shows another example of transmitting load information using a cluster head according to an embodiment of the present invention.

FIG. 16 shows another example of transmitting load information using a cluster head according to an embodiment of the present invention.

FIG. 17 shows another example of transmitting load information using a cluster head according to an embodiment of the present invention.

FIG. 18 shows another example of transmitting load information using a cluster head according to an embodiment of the present invention.

FIG. 19 shows another example of transmitting load information using a cluster head according to an embodiment of the present invention.

FIG. 20 is a block diagram showing wireless communication system to implement an embodiment of the present invention.

MODE FOR THE INVENTION

Figure 1:
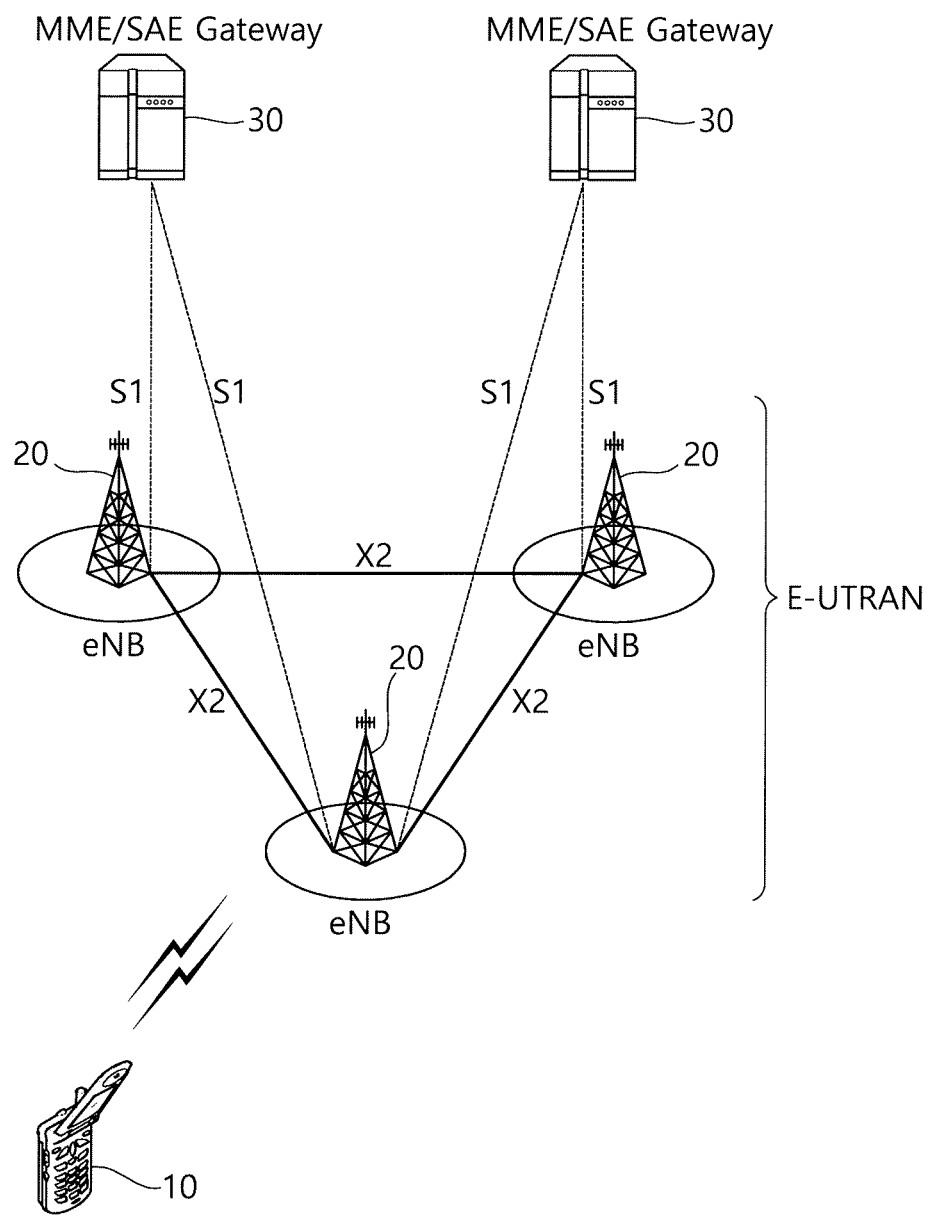
FIG. 1 shows network structure of an evolved universal mobile telecommunication system (E-UMTS).
Figure 2:
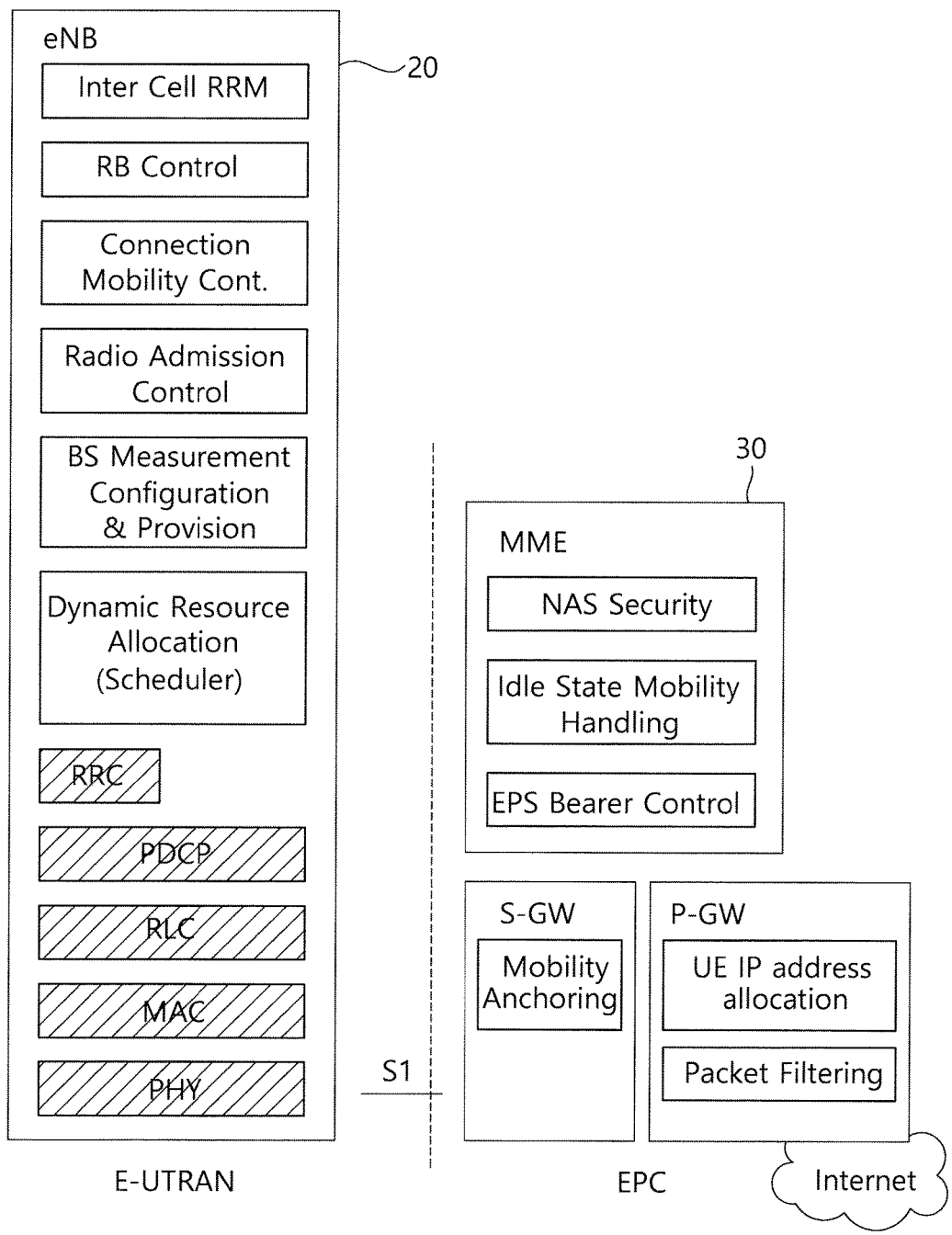
FIG. 2 shows architecture of a typical E-UTRAN and a typical EPC.
Figure 3:
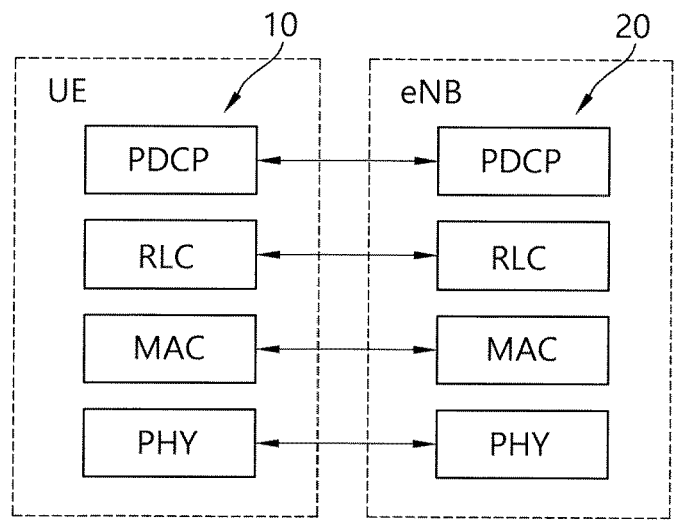
FIG. 3 shows a user-plane protocol and a control-plane protocol stack for the E-UMTS.
Figure 3:
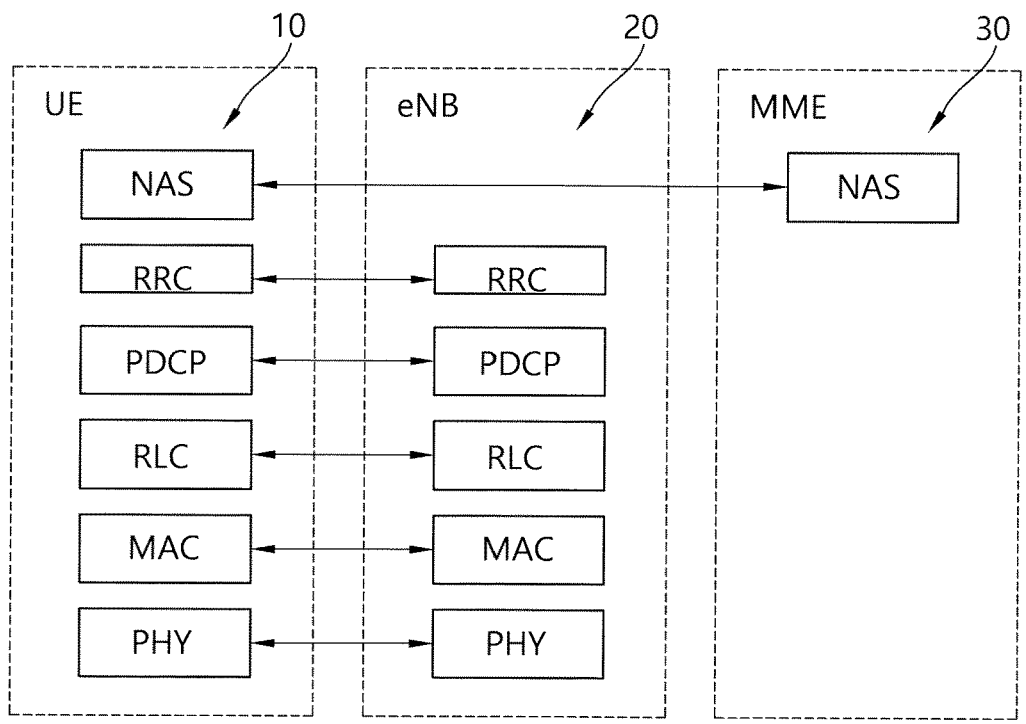
Figure 4:
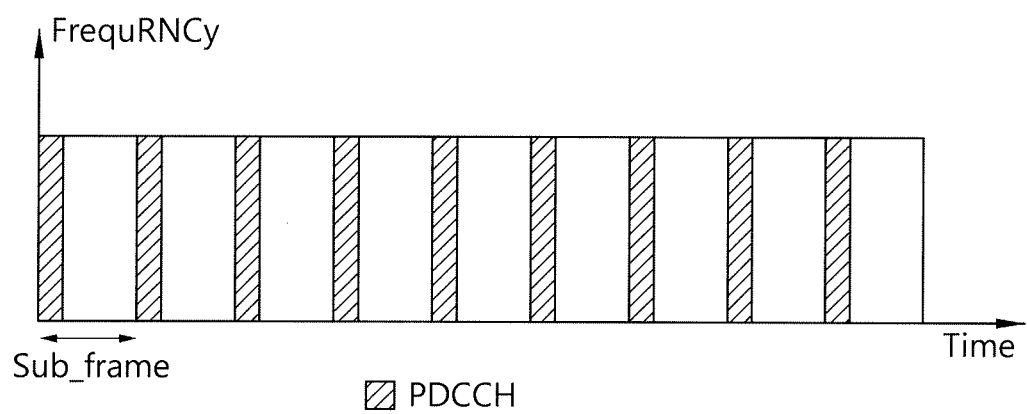
FIG. 4 shows an example of structure of a physical channel.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

On top of an existing macro UMTS system deployment, an LTE system may tend to be deployed as a form of small cells such as pico cells in hotspot areas as an initial type of deployment. By deploying the small cells in a hotspot area, supporting higher capacity for the heterogeneous traffic demand for certain area may result in better performance for users.

Types of hotspots may vary according to density of the small cells or where the hotspot area is located. From the perspective of density for hotspot coverage, the small cells can be deployed densely or sparsely. Also the hotspot area can be formed in outdoor areas such as train stations or busy urban areas, or indoor areas such as, airports, shopping malls, and office buildings.

FIG. 5 shows an example of hotspot deployment of LTE small cells with a UMTS macro cell.

Referring to FIG. 5, a UMTS Node B provides a UMTS macro cell. The Node B is connected with a radio network controller (RNC). Each of eNodeB (eNB)1 to eNB7 provides a hotspot LTE small cell, respectively. eNB1 to eNB5 are deployed densely in a hotspot area. eNB6 and eNB7 are deployed sparsely in a hotspot area. Each eNB is connected with a mobility management entity (MME). The MME and the RNC is connected via a serving GPRS support node (SGSN).

One of major purposes of hotspot deployment is to boosting up the capacity for the corresponding areas. The indoor data offloading reduces interference with outdoor macro cells, and it can also provide reduction in battery consumption. However, for efficient use of available spectrum, traffic data steering considering load information of macro and pico cells needs to be considered. In the example described in FIG. 5, load balancing between the UMTS macro cell and the hotspot LTE small cells is to be considered for efficient use of overlay networks.

Currently, load balancing for inter-radio access technology (RAT) can be provided using radio access network (RAN) information management (RIM) function for inter-RAT in a self-optimization network (SON). In this procedure, load information is transferred between RAN nodes via a core network.

FIG. 6 shows an example of a current inter-RAT RIM procedure.

At step S50, an eNB transmits an eNB direct information transfer message including RIM information to an MME via the S1 interface. At step S51, the MME transmits an RAN information relay message including the RIM information to an SGSN via the S3 interface. At step S52, the SGSN transmits a direct information transfer message including the RIM information to an RNC via Iu-ps interface. At step S53, the RNC transmits a direct information transfer message including the RIM information to the SGSN via Iu-ps interface. At step S54, the SGSN transmits an RAN information relay message including the RIM information to the MME via the S3 interface. At step S55, the MME transmits an MME direct information transfer message including the RIM information to the eNB via the S1 interface.

However, when the LTE small cells are deployed densely in hotspot areas, heavy signaling overhead may be caused with current RIM procedure. For example, referring to FIG. 5 described above, it is assumed that eNB1, eNB2 and eNB3, among eNB1 to eNB5 deployed in a hotspot area, request load information to the RNC. In this case, each eNB transmits the eNB direct information transfer message to the MME, and therefore, heavy signaling overhead may occur.

FIG. 7 shows an example of singling overhead according to a current inter-RAT RIM procedure.

Referring to FIG. 7, at step S60, eNB1, eNB2, and eNB3 transmit eNB direct information transfer messages including RIM information to the MME via the S1 interface, respectively. At step S61, the MME transmits RAN information relay messages including the RIM information, for the eNB1, eN2, and eNB3, to the SGSN via the S3 interface. At step S62, the SGSN transmits direct information transfer messages including the RIM information, for the eNB1, eN2, and eNB3, to the RNC via Iu-ps interface. At step S63, the RNC transmits direct information transfer messages including the RIM information, for the eNB1, eN2, and eNB3, to the SGSN via Iu-ps interface. At step S64, the SGSN transmits RAN information relay messages including the RIM information, for the eNB1, eN2, and eNB3, to the MME via the S3 interface. At step S65, the MME transmits MME direct information transfer messages including the RIM information to the eNB1, eN2, and eNB3 via the S1 interface, respectively.

As describe above, as the number of eNBs increases, signaling overhead increases linearly. Signaling overhead can cause overload on a network.

FIG. 8 shows an eNB direct information transfer procedure. It may be referred to Section 8.13 of 3GPP TS 36.413 V11.2.0 (2012-12).

Referring to FIG. 8, at step S70, the eNB transmits an eNB direct information transfer message to the MME. The purpose of the eNB direct information transfer procedure is to transfer RAN information from the eNB to the MME in unacknowledged mode. The MME does not interpret the transferred RAN information.

FIG. 9 shows an MME direct information transfer procedure. It may be referred to Section 8.14 of 3GPP TS 36.413 V11.2.0 (2012-12).

Referring to FIG. 9, at step S80, the MME transmits an MME direct information transfer message to the eNB. The purpose of the MME direct information transfer procedure is to transfer RAN information from the MME to the eNB in unacknowledged mode. This procedure uses non-user equipment (UE) associated signaling.

FIG. 10 shows a resource status reporting initiation procedure. It may be referred to Section 8.3.6 of 3GPP TS 36.423 V11.2.0 (2012-09).

Referring to FIG. 10, at step S90, the eNB1 transmits a resource status request message to the eNB2. At step S91, the eNB2 transmits a resource status response message to the eNB1 in order to indicate that the eNB2 initiates the measurement as requested by the eNB 1. This procedure is used by an eNB to request the reporting of load measurements to another eNB. The procedure uses non UE-associated signaling.

FIG. 11 shows a resource status reporting procedure. It may be referred to Section 8.3.7 of 3GPP TS 36.423 V11.2.0 (2012-09).

Referring to FIG. 11, at step S93, the eNB2 transmits a resource status update message to the eNB1. This procedure is initiated by the eNB2 to report the result of measurements admitted by the eNB2 following a successful resource status reporting initiation procedure. The procedure uses non UE-associated signaling. The eNB2 shall report the result of the admitted measurements in a resource status update message. The admitted measurements are the measurements that were successfully initiated during the preceding resource status reporting initiation procedure.

Hereinafter, an efficient load balancing method when at least two small cells are deployed densely in a hotspot area is described according to embodiments of the present invention. According to an embodiment of the present invention, overloads due to heavy signaling on S1 interface between a core network and eNBs/MME can be reduced, when information on cells including load information are exchanged between different RATs in interworking of the UMTS and LTE. The information on cells may include load information and various types of information for interworking of the UMTS and LTE.

According to the embodiment of the present invention, new architecture may be introduced when multiple small cells are deployed in a hotspot area. In the new architecture, one small cell among the multiple small cells may be set to a cluster head (CH), and the remaining small cells may have an interface with an MME via the CH. In the conventional art, each eNB, providing small cells, has S1 interface with the MME. On the other hand, according to the embodiment of the present invention, small cells have an interface with the CH, and the CH has an interface with the MME. The interface between the small cells and the CH may be the X2 interface, or the like. The interface between the CH and the MME may be the S1 interface, or the like. The CH may be called a master eNB. In this case, each of the remaining small cells may be called a slave eNB.

FIG. 12 shows an example of hotspot deployment of LTE small cells with a UMTS macro cell according to an embodiment of the present invention.

Referring to FIG. 12, the UMTS Node B provides the UMTS macro cell. The Node B is connected with the RNC. Each of eNB1 to eNB5 provides the hotspot LTE small cell, respectively. eNB1 to eNB5 are deployed densely in the hotspot area. eNB5 is set to the CH, and is connected with the MME via the S1 interface. The remaining eNBs, i.e. eNB1 to eNB4, are connected with the CH, i.e. eNB5, via the X2 interface. The MME and the RNC is connected via the SGSN.

A various methods for exchanging load information between inter-RATs in the new architecture according to the embodiment of the present invention are described below.

FIG. 13 shows an example of transmitting load information using a cluster head according to an embodiment of the present invention. FIG. 13 shows that the LTE system requests load information from the UMTS system, and acquires the load information of a cell of the UMTS system.

At step S100 and S101, the eNB1 and eNB2, located in a cluster of small cells, transmit resource status request messages requesting cell load information to the CH, respectively. The resource status request message is previously defined in the X2 interface. Or, the eNBs may use a newly defined message for requesting the cell load information. The message may include a cell identifier (ID) of a target cell.

At step S110, upon receiving the resource status request messages requesting the cell load information, the CH delivers the resource status request messages to the MME. The CH may use an eNB direct information transfer message for delivering the resource status request messages to the MME. The eNB direct information transfer message may be transmitted via the S1 interface. The eNB direct information transfer message may include RIM information. In addition, the eNB direct information transfer message may include the cell ID of the target cell, requested by the eNBs in the cluster, in a SON transfer request container. Since the CH collects the resource status request messages requesting the cell load information from the eNBs in the cluster, and transmits to the MME using one eNB direct information transfer message, signaling overhead on the S1 interface may be reduced.

At step S120, upon receiving the eNB direct information transfer message, the MME delivers the eNB direct information transfer message to the SGSN using a RAN information relay message. At step S130, upon receiving the RAN information relay message, the SGSN transmits a direct information transfer message to the RNC. The direct information transfer message may include the RIM information, like the conventional RIM procedure.

At step S140, the RNC transmits a direct information transfer message to the SGSN, as a response to the direct information transfer message received from the SGSN. The direct information transfer message may include RIM information including a base station system GPRS protocol (BSSGP) RIM protocol data unit (PDU). The BSSGP RIM PDU may include an SON transfer response container, and the SON transfer response container may include cell load information. At step S150, upon receiving the direct information transfer message, the SGSN transmits a RAN information relay message including the cell load information to the MME.

At step S160, the MME delivers the information received from the SGSN to the CH. The MME transmits an MME direct information transfer message, including the RIM information and the cell load information, to the CH. The MME direct information transfer message may be transmitted via the S1 interface. Accordingly, the CH can receive the cell load information requested by the eNBs. Since the MME transmits the MME direct information transfer message to the CH once, signaling overhead on the S1 interface may be reduced.

At step S170 and S171, the CH transmits resource status response messages to the eNB1 and eNB2, respectively, as a response to the resource status request messages, transmitted in step S100 and S101. The resource status response message may be transmitted via the X2 interface. The resource status response message includes the cell load information requested by the eNB1 and eNB2. Or, instead of the resource status response message, the resource status update message may be transmitted via the X2 interface for this purpose.

According to the embodiment of the present invention described in FIG. 13, the eNBs may acquire the cell load information of the cell of the UMTS system using the CH. The eNBs in the cluster may request cell load information when information on a target cell is needed.

FIG. 14 shows another example of transmitting load information using a cluster head according to an embodiment of the present invention.

Referring to FIG. 14, at step 1~6, the master eNB requests and acquires from the neighboring RNC the UTRAN cell load information using existing RIM procedure. The UTRAN cell load information may include an address of the master enB. At step 7, the master eNB transmits UTRAN cell load information to the slave eNB1, 2 and 3 via the X2 interface respectively, based on the UTRAN cell load request from the slave eNB1, 2 and 3 at step 0.

In case of event-triggered cell load reporting, when the UTRAN cell load meets the reporting criterion, the RNC would transmit a report to the master eNB via the SGSN and the MME. Upon receiving the new cell load, the master eNB transmits it to the slave eNB1, 2 and 3 at step 7 via the X2 interface again.

According to the embodiment of the present invention described in FIG. 14, the duplicated event triggering UTRAN cell load reporting in Iu, S3 and S1 interfaces may be reduced. There is no impact to the RIM procedure among the master eNB, MME, SGSN and RNC. When the master eNB receives the UMTS cell load from the RNC, there are three ways for the master eNB to transmit the cell load to the slave eNBs:

1) The master eNB would transfer the received RIM PDU which contains the requested/updated UTRAN cell load to the slave eNBs with some modification. Before transfer, the master eNB would change the Destination Cell Identifier from master eNB-id to slave eNB-id in the received RIM PDU.

2) The master eNB would transfer the received RIM PDU which contains the requested/updated UTRAN cell load to the slave eNBs directly without any modification. The slave eNBs who receives the RIM PDU should ignore the Destination Cell Identifier in the RIM PDU.

3) The master eNB would derives the requested/updated UTRAN cell load from the RIM PDU and transmits the UMTS cell load to the slave eNBs via the X2 interface with new IE or new procedure.

Before requesting the UMTS cell load, the neighboring eNBs of the UTRAN cell should be grouped. The eNB group could be configured by operation, administration, and maintenance (OAM) or self established via new defined X2 interface procedure. Each eNB group may consist of several slave eNBs and one master eNB. The master eNB of the group could request/acquire the neighboring UTRAN cell load reporting as agency for the other slave eNBs in the group.

As the number of slave eNBs in the group increases, the number of RIM PDU transmission via the MME, SGSN and RNC will be decreased by using enhanced RIM transmission. That is, the more slave eNBs are in the group, the more signaling reduction is achieved from the aspect of cost for the RIM-PDU transmission via the path of RNC/SGSN/MME/eNB.

FIG. 15 shows another example of transmitting load information using a cluster head according to an embodiment of the present invention. FIG. 15 shows that the LTE system reports load information in an event-triggered manner. That is, the load information may be reported when a specific event occurs. Cell load may be divided to a plurality of load levels, and the load information may be reported when the cell load changes across the load levels.

At step S200, the RNC transmits an event-triggered cell load reporting request message to the eNB1 through the MME. It is assumed that load level of the eNB1 changes. At step S210, the eNB1 transmits a load information message to the CH. The load information message may be transmitted via the X2 interface. The load information message includes cell load information. Or, instead of the load information message, the resource status update message may be transmitted via the X2 interface for this purpose.

The CH transmits the received load information to the RNC according to the conventional RIM procedure. That is, at step S220, the CH transmits an eNB direct information transfer message, including an event-triggered cell load reporting response message and the cell load information from the eNB1, to the MME. The eNB direct information transfer message may be transmitted via the S1 interface. At step S230, the MME transmits a RAN information relay message including the cell load information to the SGSN.

At step S240, the SGSN transmits a direct information transfer message, including RIM information and the cell load information, to the RNC. Accordingly, the RNC may acquire cell load information of the eNB1.

In addition, the load information message may be transmitted periodically. Each eNB in the cluster may transmit the load information message to the CH periodically, and the CH may transmit the received load information to the RNC according to the conventional RIM procedure. For this, RNC may previously transmit a periodic cell load reporting request message to the eNBs.

FIG. 16 shows another example of transmitting load information using a cluster head according to an embodiment of the present invention. FIG. 16 shows that the UMTS system requests load information from the LTE system, the small cells of the LTE system reports cell load information to the UMTS system.

At step S300, the RNC transmits a direct information transfer message to the SGSN. The direct information transfer message may include RIM information. At step S310, upon receiving the direct information transfer message, the SGSN transmits a RAN information relay message to the MME.

At step S320, upon receiving the RAN information relay message, the MME transmits an MME direct information transfer message including the RIM information to the CH. The MME direct information transfer message may be transmitted via the S1 interface. Since the MME transmits the MME direct information transfer message to the CH once, signaling overhead on the S1 interface may be reduced.

At step S330 and S331, upon receiving MME direct information transfer message, the CH transmits resource status request messages to the eNB1 and eNB2, respectively. The resource status response message may be transmitted via the X2 interface.

At step S340 and S341, upon receiving the resource status request message, the eNB1 and eNB2, located in a cluster of small cells, transmit resource status response messages to the CH, respectively. The resource status request message may be transmitted via the X2 interface. The resource status response message includes cell load information requested by the RNC.

At step S350, upon receiving the resource status response messages including the cell load information, the CH transmits an eNB direct information transfer message for delivering the resource status response messages to the MME. The eNB direct information transfer message may be transmitted via the S1 interface. The eNB direct information transfer message may include RIM information. Since the CH collects the resource status response messages including the cell load information from the eNBs in the cluster, and transmits to the MME using one eNB direct information transfer message, signaling overhead on the S1 interface may be reduced.

At step S360, upon receiving the eNB direct information transfer message, the MME transmits a RAN information relay message for delivering the eNB direct information transfer message to the SGSN. At step S370, upon receiving the RAN information relay message, the SGSN transmits a direct information transfer message to the RNC. The direct information transfer message may include the RIM information.

According to the embodiment of the present invention described in FIG. 16, the RNC may acquire the cell load information of the small cells of the LTE system using the CH.

FIG. 17 shows another example of transmitting load information using a cluster head according to an embodiment of the present invention.

Referring to FIG. 17, the RNC requests the master eNB for the E-UTRAN cell load of the slave eNB 1, eNB 2 and 3 by setting Destination Cell Identifier as master eNB-id meanwhile setting Reporting Cell Identifier as cell IDs those can belong to the slave eNB1, eNB2, and eNB3. Upon receiving the RIM PDU aims at cell load request, the master eNB checks whether the load of cells listed in the Reporting Cell Identifier is available. If not available, the master eNB need to identify which eNBs the cells in the Reporting Cell Identifier list belong to and request the cell load via the X2 interface. Afterwards, the master eNB could encapsulate all requested E-UTRAN cell load in one single RIM PDU and transmit them to the RNC, if the requested events on different slave eNBs happen and the triggered cell load reporting from those eNB arrive the master eNB at the same time.

Before requesting the E-UTRAN cell load, the neighboring eNBs of the UTRAN cell should be grouped. The eNB group could be configured by the OAM or self established via new defined X2 interface procedure. Each eNB group may consist of several slave eNBs and one master eNB. The eNB group information could also be configured in the RNC by the OAM or received from the master eNB via new defined RIM procedure. Then, the RNC could request the master eNB for the load reporting of more than one slave eNBs of the group. Based on the request, the master eNB requests the cell load of the slave eNBs via X2 interface and then reports them to the RNC.

As the number of slave eNBs in the group increases, the number of RIM PDU transmission via the MME, SGSN and RNC will be decreased by using enhanced RIM transmission. That is, the more slave eNBs are in the group, the more signaling reduction is achieved in the RIM-PDU transmission via the path of RNC/SGSN/MME/eNB.

FIG. 18 shows another example of transmitting load information using a cluster head according to an embodiment of the present invention. FIG. 18 shows that the UMTS system reports load information in an event-triggered manner.

At step S400, the eNB1 transmits an event-triggered cell load reporting request message to the RNC through the MME. It is assumed that load level of the RNC changes. At step S410, the RNC transmits a direct information transfer message to the SGSN. The direct information transfer message may include RIM information, and include cell load information.

The SGSN transmits the received cell load information to the eNB1 according to the conventional RIM procedure. That is, at step S420, the SGSN transmits a RAN information relay message including the cell load information to the MME. At step S430, the MME transmits an MME direct information transfer message, including an event-triggered cell load reporting response message and the cell load information, to the CH. The MME direct information transfer message may be transmitted via the S1 interface.

At step S440, the CH transmits a load information message to the eNB1. The load information message which includes the cell load information of the RNC may be transmitted via the X2 interface. Accordingly, the eNB1 may acquire cell load information of the RNC. Or, instead of the load information message, the resource status update message may be transmitted via the X2 interface for this purpose.

FIG. 19 shows another example of transmitting load information using a cluster head according to an embodiment of the present invention. FIG. 19 shows that the UMTS system reports load information in a periodic manner.

At step S500, the RNC transmits a direct information transfer message including cell load information to the SGSN. The SGSN transmits the received cell load information to the eNBs according to the conventional RIM procedure. That is, at step S510, the SGSN transmits a RAN information relay message including the cell load information to the MME. At step S520, the MME transmits an MME direct information transfer message including the cell load information to the CH. The MME direct information transfer message may be transmitted via the S1 interface.

At step S530, the CH transmits load information messages to the eNB1 and eNB2, respectively. The load information message may be transmitted via the X2 interface. Accordingly, the eNBs may acquire cell load information of the RNC.

At step S540, the RNC transmits the direct information transfer message to the SGSN periodically again.

In the method for transmitting load information using a cluster head according to the embodiments of the present invention described above, previously defined messages, e.g. the resource status request message, resource status response message, eNB direct information transfer message, MME direct information transfer message, are used. However, embodiments of the present invention are not limited thereto, and newly defined message may be used for transmitting load information using a cluster head.

FIG. 20 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An MME or an eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a cluster head eNodeB (eNB) of a Long Term Evolution (LTE) system, cell load information in a wireless communication system, the method comprising:
receiving cell load information requests of a cell in a Universal Mobile Telecommunications System (UMTS) from a plurality of slave eNBs of the LTE system, wherein the plurality of slave eNBs are connected with a mobility management entity (MME) through the cluster head eNB;
receiving the cell load information of the cell in the UMTS, from a radio network controller (RNC) of the UMTS; and
transmitting the received cell load information of the cell in the UMTS to the plurality of slave eNBs of the LTE system, respectively, in response to the received cell load information requests,
wherein the cluster head eNB is directly connected with the MME via an S1 interface and the plurality of slave eNBs via an X2 interface.

2. The method of claim 1, wherein the cell load information of the cell in the UMTS is received using an MME direct information transfer message via the S1 interface, and
wherein the cell load information of the cell in the UMTS is received from the RNC via the MME and a serving general packet radio service (GPRS) support node (SGSN).

3. The method of claim 1, wherein the cell load information of the cell in the UMTS includes an address or an identifier (ID) of the cluster head eNB, or an ID of the cell in the UMTS.

4. The method of claim 1, wherein the received cell load information is transmitted using a resource status response message via the X2 interface.

5. The method of claim 1, wherein the received cell load information is transmitted using a resource status update message via the X2 interface.

6. The method of claim 1, wherein the cell load information requests are received using a resource status request message via the X2 interface.

7. The method of claim 1, wherein the cell load information of the cell in the UMTS is received in an event-triggered manner.

8. The method of claim 1, wherein the cluster head eNB of the LTE system and the plurality of slave eNBs of the LTE system are grouped.

9. A cluster head eNodeB (eNB) of a Long Term Evolution (LTE) system for transmitting cell load information in a wireless communication system, the cluster head eNB comprising:
   a memory;
   a transceiver; and
   a processor, connected with the memory and the transceiver, that:
      controls the transceiver to receive cell load information requests of a cell in a Universal Mobile Telecommunications System (UMTS) from a plurality of slave eNBs of the LTE system, wherein the plurality of slave eNBs are connected with a mobility management entity (MME) through the cluster head eNB,
      controls the transceiver to receive the cell load information of the cell in the UMTS, from a radio network controller (RNC) of the UMTS, and
      controls the transceiver to transmit the received cell load information of the cell in the UMTS to the plurality of slave eNBs of the LTE system, respectively, in response to the received cell load information requests,
      wherein the cluster head eNB is directly connected with the MME via an S1 interface and the plurality of slave eNBs via an X2 interface.

* * * * *